2,898,303
METHOD OF EXPANDING PERLITE

Harry H. Houston, Elmhurst, Ill., assignor to International Minerals & Chemical Corporation, a corporation of New York No Drawing. Application August 9, 1956
Serial No. 603,188

12 Claims. (Cl. 252—378)

This invention relates to a method of processing particulate material. More particularly, it relates to an improved method of producing finely divided particles, suitable for use as a filter aid or as a filler, from perlite ore.

Crude or raw perlite is a volcanic glass having a silica content of about 65–70% by weight, together with about 12–16% alumina, 2–5% entrapped water, 7–10% alkali metal oxides and small amounts of oxides of iron, calcium and magnesium. A characteristic property of perlite and of similar volcanic glasses containing upwards of 2% water is that when such material is exposed in fine particle form to temperatures in the range of about 1500–2100° F., softening and rapid expansion or puffing of the particles takes place to produce a cellular expanded product having an extremely low density. Because of its low density, chemical inertness and heat resistance, fully expanded perlite has considerable value as a heat insulating material, and for other applications, such as an aggregate in plaster, concrete and the like.

Perlite particles expanded by conventional heating methods contain a plurality of sealed, sponge-like air cells or individual spheres, the particles thus being capable of floating indefinitely in liquids such as water. In such expanding methods, a minor amount of "fines," i.e., fractured, finely divided particles are produced. It has been found that these fines are suited for use as a filter aid material, since they provide a great surface area, having a low bulk density, a low wet density, and unlike the expanded "whole" particles, they do not float on water or other liquids. Many attempts have been made to increase the production of such finely divided material from expanded perlite by grinding and other comminuting operations. In U.S. patent application, Serial No. 410,065, filed February 15, 1954, by Gindoff, McCollum and Polanco (issued as U.S. Patent No. 2,853,241, on September 23, 1958), a process and apparatus are described for the production of finely divided materials. This application discloses how perlite particles may be expanded and impacted against abrading surfaces to fracture the expanded particles and produce a product suitable for use as a filter aid. The product has a large surface area, low bulk density, low wet density, and a substantial portion of the product will not float in aqueous fluids. The product gives flow rates that are entirely comparable with those of conventional diatomaceous earth filter aids. The product is white in color and has light reflecting properties which make it suitable for use as a filler in paper, paint and other products.

Although the fine expanded perlite product produced in this manner is suitable for use as a filter aid and as a filler, the perlite product does not differ substantially from filter aids and fillers being used at the present time. When the properties of an abundant and inexpensive filter aid material can be altered to give an improved flow rate, as well as improved filtrate clarity and lower wet density, the cost of the filtration operation may be reduced by a substantial amount. In addition, the value of the inexpensive material may be enhanced. Similarly, when the light reflecting properties of an abundant and inexpensive filler material are substantially improved, there may be a savings in the cost of the final product, in view of the reduced cost of the filler material. In addition, more expensive fillers may be diverted to other uses.

One of the primary objects of this invention is to provide a process for the production of a perlite material having improved filtration characteristics and improved light reflecting properties.

Another object of this invention is to provide an improved process for the production of material suitable for use as a filter aid or as a filler from perlite ore.

It is still another object of this invention to provide an improved process for producing high quality finely divided material preferably utilizing as a raw material what has heretofore been considered as waste material from the grinding of perlite ores, i.e., ground perlite ore of minus 30 mesh or less.

These and other objects and advantages of this invention will be readily apparent from the following detailed description.

It has been discovered that a perlite material having improved filtration properties and improved light reflecting properties may be produced by contacting perlite ore with a dilute acid solution prior to expansion. In addition, it has been found that ground perlite ore, after contact with a dilute acid solution, will expand at a greater rate at a given temperature, and will produce a larger percentage of "fines" under given abrading conditions than can be obtained from untreated ground perlite ore at the same expansion temperature and under the same abrading conditions.

Studies of the thermal properties of a sample of perlite ore obtained from the vicinity of Superior, Arizona were made by King, Todd, and Kelley, and reported in U.S. Bureau of Mines Report of Investigations No. 4394. It was concluded by these investigators that the water content of this perlite sample above about 1.2% is loosely held, and at lower water contents the water is progressively more firmly bound. Heat of solution measurements indicated that the last removable water is tenaciously held, and that water up to about 0.5% may be considered as comparatively firmly bound. It was also concluded that the water content below about 1.2% is very likely the only water that is effective in the expansion of perlite upon heating. It is believed that when the ground perlite ore is contacted with a dilute acid solution under conditions described more fully below, the acid has a dehydrating effect upon part of the water in the perlite material. As a result, less heat is required to raise the dehydrated product to its temperatue of expansion.

Microscopic examination of the perlite ore particles which are not given a treatment with a dilute acid solution indicates that the major portion of the particles have rounded corners and are opaque. If ground perlite ore particles are treated with a dilute acid solution under conditions described more fully below, prior to expansion and abrading, microscopic examination of these particles indicates that the major portion of the particles are relatively free of rounded edges, and are translucent. Chemical analysis of the acid solution after contacting the ore indicates that some of the alkaline oxides and surface impurities are removed from the perlite particles. It is believed that the acid treatment produces microscopic etching on the surface of the particles, which in turn improves the filtration properties of the particles. In addition, it is believed that the removal of opaque surface impurities and the increased surface area of the perlite particles caused by acid treatment results in the improved light reflecting properties. In the specification, the term "activation" is used to describe the reaction or treatment of perlite particles with a dilute acid solution under proper conditions to provide perlite particles which expand at a greater rate and produce a higher yield of fractured expanded perlite upon abrasion than untreated particles, and which have improved light reflecting properties and improved filtration properties after expansion.

More in detail, ground perlite ore having a particle size of about —30 mash or less may be utilized. Perlite ore of larger particle size may be used if desired, but from the standpoint of economy and the obtaining of more uniform expansion, it is preferred to use particles less than about 30 mesh.

The ore is treated in a suitable reactor with a dilute solution of a mineral acid such as sulfuric acid, hydrochloric acid, nitric acid, hydrofluoric acid, phosphoric acid, or fluosilicic acid under conditions described more fully hereinafter.

The reactor is constructed of a suitable material, having an interior surface that will resist corrosive attack by the dilute acid solution at the operating temperature. The reactor is preferably equipped with an agitating means to insure intimate contact between the acid solution and the perlite particles. It is preferred that the reactor be equipped with a heating means such as a steam jacket or immersion coils. However, when the reactants are heated, sufficient agitation may be obtained by convection currents produced in the slurry. It is preferred that the reactor be equipped with a means of condensing and refluxing the vapors produced when the reactants are heated. However, if a condensing and refluxing means is not provided, make-up water may be added to the slurry to replace that lost as steam.

Some of the factors in the activation of the ore which seem to affect the proporties of the expanded ore are the concentration of the acid used, the amount of the acid used, the temperature of the slurry during the reaction, and the time of contact.

The concentration of the dilute acid solution should be between about 0.05 and about 0.6 mol of acid in 100 grams of solution. Preferably, the concentration should be between about 0.25 and about 0.5 mol of acid in 100 grams of solution. When the acid is too dilute, there is no substantial improvement in the properties of the perlite product, unless extreme conditions of reaction time and reaction temperature are used. When the concentration of the acid exceeds about 0.6 mol per 100 grams of solution, there is no substantial improvement in the properties of the product above those obtained with more dilute solution. In addition, when the concentration of the acid exceeds this amount, there may be excessive deterioration and solubilization of the perlite particles. This is particularly true when hydrofluoric acid solutions are contacted with the perlite particles. When the perlite particles are contacted with a 50% hydrofluoric acid solution, the particles are substantially all dissolved. Therefore, extreme care must be taken when hydrofluoric acid is used, in order to prevent excessive solubilization of the perlite. From the standpoint of control, as well as health and corrosion, hydrofluoric acid is less desirable than the other acids.

The quantity of dilute acid solution used should be sufficient to cover the perlite particles in the reactor, in order that intimate contact between the solids and acid solution can be obtained. The slurry may consist of between about 40% and about 70% solids, but preferably between about 50% and about 60%. When smaller quantities of acid solution are used, the time required to activate the perlite particles is increased due to the poor contact between acid and solids. When larger quantities of acid are used, there is no substantial decrease in the time required to activate the particles. The slurry should be maintained at the proper solids to liquid ratio during the reaction by means of reflux or make-up water.

The slurry of perlite particles and a dilute acid solution may be heated to increase the rate of reaction. The slurry is heated to a temperature between about 60° C. and about the boiling point of the acid solution to increase the reaction rate. Preferably, the slurry is heated to about the boiling point. Although the reaction may be carried out at room temperature, extended periods of time are required in order to obtain the desired activation of the particles.

The reaction time is dependent upon the concentration and quantity of the acid, the type of acid used, and the temperature of the reaction. When the slurry is heated to the boiling point, the reaction time may be between about 0.25 hour and about 4 hours, but preferably between about 1.5 and about 3 hours. When the slurry is heated for less than about 15 minutes, there is no substantial improvement in light reflecting properties of the particles after expansion, as compared to untreated ore. When the time of reaction exceeds about 4 hours, there is improvement in the light reflecting properties of the particles as compared to particles heated in the acid for between 1.5 and about 3 hours, but the improvement is not substantial enough to justify the excessive reaction time.

Mild agitation of the slurry during acid treatment aids in decreasing the time required to activate the perlite particles. The degree of agitation need be no greater than the agitation required to prevent the perlite particles from settling to the bottom of the reactor. Frequently, when the slurry is dilute, sufficient agitation is provided by heating the slurry to a temperature at about the boiling point. The acid treatment of the perlite particles can be carried out without agitation, but decreased agitation substantially increases the time required to activate the perlite particles.

The acid treatment of the perlite particles may be carried out batchwise or in a continuous operation. When a batch operation is used, the slurry is allowed to react in a suitable reactor under desired conditions. After reaction, the perlite particles are separated from the slurry by classification, filtration or other suitable means, washed with water to remove the acid, and dried at about 110° to remove excess moisture. The decanted acid may be reconstituted by adding make-up acid in an amount equivalent to between about 0.01 and about 0.05 mol of acid per 100 grams of solid, and then reused to treat other batches of perlite particles. The dried activated perlite particles are then expanded in the manner described more fully below.

As a modification of the acid treatment, the perlite particles may be treated with acid in a continuous operation, such as in a suitable pug mill or in a standard leaching operation where the perlite particles are passed through a series of leaching stages in countercurrent flow with the acid. In the leaching operation, fresh perlite particles are contacted with partially spent acid in the first stage, and perlite particles which are almost completely activated are contacted with fresh acid in the final leaching stage. Make-up acid may be added at the leaching stages, and the acid recovered from the first leaching stage may be reconstituted with fresh acid and recycled to the last leaching stage. There is a suitable bleed-off in the acid system to prevent a build-up of impurities in the acid. The activated perlite product from the last leaching stage may be separated from the acid by decantation, filtration or other suitable means, washed with water, decanted, and dried at about 100° C. to reduce the moisture content. The dried activated perlite product of the continuous operation may then be expanded in the same manner as the product obtained in the batch operation described above.

Although it is preferred to wash the perlite particles free of acid prior to expansion, the washing step is not absolutely necessary to obtain perlite material having improved filtration and light reflecting properties. However, heating and expanding acid treated perlite material that has not been washed will cause corrosive acid vapors to form which will adversely affect the heating and expansion equipment. Therefore, from the standpoint of eliminating a corrosion problem it is preferred to wash the perlite solids prior to expansion.

Expansion of the dried activated perlite product is preferably carried out at a temperature between about 1500° and about 2100° F. Expansion can be obtained in an inclined rotary calciner, in a vertical shaft furnace, or other type of furnace presently used in the industry for the expansion of fine perlite particles. It is preferred to expand the particles in an apparatus of the type described in the above-mentioned U.S. patent application Serial No. 410,065, filed February 15, 1954. This apparatus is equipped with abrading means which enables a maximum amount of fine perlite particles to be obtained after expansion.

The perlite particles are fed into the flame of a vertical furnace where the particles are expanded and carried by combustion gases to abrading surfaces in a section above the combustion chamber. The expanded particles are abraded to produce a maximum amount of fines and conveyed to a cyclone separator where a size separation is made at about 50 microns. The larger particles are collected from the apex of the cyclone and recycled to the abrading section. The smaller particles from the top of the cyclone are cooled in a heat exchanger and subjected to another size separation in a second cyclone separator. The larger particles from this separator, having a size greater than between about 15 and about 30 microns are suitable for use as a high quality filter aid and filler material. This material is collected in the product bin. The smaller particles from the cyclone separator are collected in the bag house. This material is suitable for use as a high clarity-low filtration rate filter aid.

In a preferred embodiment of the invention, a sulfuric acid solution having a concentration between about 0.25 and about 0.5 mols of $H_2SO_4$ and 100 grams of solution is heated to about the boiling point. Ground perlite particles having a mesh size less than about 30 mesh are slowly added to the heated acid until a slurry of between about 50% and about 60% solids is obtained. The temperature of the slurry is maintained at about the boiling point for a period of between about 1.5 and about 3 hours. The solution is decanted and the solids are washed with several portions of water until the wash water is substantially neutral. The wash water is decanted and the perlite solids are dried at about 110° C. for about 3 hours. The dried material is expanded and abraded as described above. It was found that the product expanded at a rate about 40% greater than untreated ore; it had a dry density of about 4½ pounds per cubic foot as compared to 6 pounds per cubic foot for untreated ore; it had a reflectance of about 84 as compared to 77 for untreated ore; in the filtration of raw sugar solution (60° Brix) at 10 p.s.i.g. and 180° F. in a standard laboratory bomb type filter press, it gave a flow rate about 50% greater than that obtained when untreated ore was used; and it provided a filtrate that had a better clarity when measured on the nefluorophotometer than that obtained when untreated ore was used. It can be seen that the acid-treated product has substantially improved filtration properties. The improvement in the light reflecting properties of the acid-treated product make it more suitable as a filler in paint, paper, and other products. The improved expansion rate of the acid-treated material permits either a reduction of fuel costs or increased capacity of the furnace.

In general, acid activation of the ore prior to expansion improves the filtration rate at least about 20% and improves the reflectance at least about 5% over that of perlite ore that has not been activated prior to expansion.

The reflectance of the perlite product was measured in a Beckman quartz spectrophotometer, Model DU, non-recording type. The samples were compared to a Vitrolite glass working standard, No. V6–B65, to determine the percent of light reflected by the sample. The working standard was calibrated by the National Bureau of Standards by comparison with the NBS Vitrolite reference standard No. V2–B4. The reflectance of the reference standard was calibrated by comparison with the reflectance of freshly prepared MgO.

The clarity of the filtrate of raw sugar solution was measured on a Fischer Nefluorophotometer. The clarity was compared with a clear solution obtained by dissolving pure sugar in water and with the first 15 milliliters of filtrate. The amount of light scattered by the sample is measured as percent of the scattered light obtained from the 15 ml. filtrate. Therefore, the higher the percentage of scattered light in the sample, the lower the clarity of the filtrate tested.

As illustrative of the character of the instant invention, but in nowise intending to be limited thereby, the following examples are described.

*Example I*

Perlite or mined in the vicinity of Fish Springs, California, was crushed to about $-\frac{3}{16}''$ mesh and dried at about 120° C. in a rotary dryer. The dryer product was screened at about 45 mesh. The +45 mesh was stored for use as a plaster aggregate. A sample of the −45 mesh ore was separated into Portions A through K.

As a control, Portion A was expanded at a temperature of between about 1500° F. and about 2100° F. by passing it through an inclined furnace in a direction concurrent to a natural gas flame. The reflectance of the expanded product, as determined by a Beckman Model No. DU spectrophotometer, using a Vitrolite working standard No. V6–B65, was found to be about 81.0.

*Example II*

Portion B of Example I was mixed with a solution containing about 0.5 mol HCl in 100 grams of solution in an amount equivalent to about 4 parts of perlite per 6 parts of acid solution. The slurry was heated at the boiling point for about 3 hours and screened on a 200 mesh screen. The solids were washed with several portions of water until the wash water was found to be neutral with respect to litmus paper. The solid was dewatered, dried at about 110° F. for about 4 hours, and fed into the inclined tube described in Example I. The temperature in the expansion zone was maintained between about 1500° F. and about 2100° F. The reflectance of the product, which was determined as in Example I, was found to be about 88.5.

*Example III*

Portion C of Example I was treated with a solution of sulfuric acid containing about 0.5 mol $H_2SO_4$ in 100 grams of solution. The perlite was treated by the same procedure followed in Example II. The reflectance of the product was found to be about 86.5. A portion of the product was ground in a ball mill until the particles were substantially all less than about 200 mesh. This material had a reflectance of about 90.4.

*Examples IV–VIII*

Portions D, E, F, G and H were treated with solutions of sulfuric acid having concentrations of about 9.6%, 12%, 19.2%, 24% and 32% respectively, in a solids to solution ratio of about 4 to 6. Each slurry was heated at the boiling point for about 2 hours. The solution was decanted from the solids, and the solids were washed with water until neutral. The wash solution was decanted from the solids, and the solids were dried at about 110° C. for about 3 hours. Each acid-treated portion was then expanded as described in Example I. Reflectivity measurements of the cooled expanded products were made as described in Example I. Table I shows the reflectance of the products obtained when the perlite particles were treated with the various concentrations of sulfuric acid.

Table I.—Variation of reflectance of expanded perlite particles with concentration of sulfuric acid used in activation.

| Example | Portion | Concentration | | Reflectance |
|---|---|---|---|---|
| | | Mols $H_2SO_4$ in 100 grams solution | Percent $H_2SO_4$ | |
| IV | D | 0.098 | 9.6 | 85.7 |
| V | E | 0.122 | 12.0 | 87.1 |
| VI | F | 0.196 | 19.2 | 87.5 |
| VII | G | 0.245 | 24.0 | 88.2 |
| VIII | H | 0.326 | 32.0 | 86.9 |

*Example IX*

Portion I of Example I was treated with a solution of nitric acid having a concentration of about 0.55 mol $HNO_3$ in 100 grams of solution. The perlite was treated in the same manner as in Example II. The reflectance of the product was found to be about 87.7.

*Example X*

As a control, Portion J was expanded and abraded in a vertical furnace of the type described in the above-mentioned U.S. patent application Serial No. 410,065. The solids were fed to the furnace at the rate of about 60 pounds per hour. The temperature in the expansion zone was maintained at about 1550° F. The expanded solids from the furnace section were carried by combustion gases through the abrading section and into a cyclone separator. The solids having a size less than about 50 microns were passed out the top of the cyclone to a cooler, and the coarse unfractured particles were collected at the bottom of the cyclone for recycle to the abrading section of the apparatus. The fractured particles from the top of the cyclone, after cooling, were passed through a second cyclone separator, where further separation was made at between about 20 and about 30 microns. The coarse particles were delivered from the apex of the second cyclone to a product bin and the fine particles from the top of the second cyclone were collected in the bagging bin. For each 100 pounds fed to the expanding-abrading apparatus, about 58 pounds, having a size greater than about 50 microns, were recovered from the apex of the first cyclone for recycle to the abrading section; about 28 pounds were collected in the product bin; and about 14 pounds were collected in the bagging bin.

The material collected in the product bin had a wet density of about 4.2. In the filtration of a 60° Brix raw sugar solution at 180° F. in a laboratory bomb type filter, the flow rate, using product bin material as a filter aid, was about 107% of that obtained using a diatomaceous earth filter aid. The clarity of the filtrate, as measured by the Fischer Nefluorophotometer, was about 65 when product bin material was used as a filter aid, as compared to about 74 when a diatomaceous earth filter aid was used. The reflectance of the product bin material, as measured on the Beckman Model DU spectrophotometer, using Vitrolite working standard No. V6-B65, was about 77. The product bin material weighed about 5.5 pounds per cubic foot.

The fine material collected in the bagging bin is suitable for use as a high clarity-flow rate filter aid. The reflectance of this material was about 75.

*Example XI*

Portion K was treated at about 50% solids with a solution of sulfuric acid having a concentration of about 0.25 mol $H_2SO_4$ in 100 grams of solution. The slurry was heated at about 212° F. for about 2 hours, decanted, and washed with water until free of acid. The solids were dried at about 110° C. for about 3 hours and fed to the expanding-abrading apparatus described in Example X. The solids were fed at the rate of about 86 pounds per hour. The temperature in the expansion furnace was maintained at about 1600° F. For each 100 pounds fed to the expanding-abrading apparatus, about 48 pounds were recovered from the apex of the first cyclone for recycle to the abrading section; about 35 pounds were collected in the product bin; and about 16 pounds were collected in the bagging bin.

The material collected in the product bin had a wet density of about 4.6. In the filtration of a 60° Brix raw sugar solution at 180° F. in a laboratory bomb type filter, the flow rate, using product bin material as a filter aid, was about 163% of that obtained using a diatomaceous earth filter aid, and about 152% of that obtained using the untreated material obtained in Example X. The clarity of the filtrate, as measured by a nefluorophotometer, was about 61 when product bin material was used as a filter aid, as compared to about 74 when diatomaceous earth and about 65 when untreated product of Example X were used as a filter aid. The reflectance of the product bin material, as measured by the method in Example X, was about 84. The product bin material weighed about 4.5 pounds per cubic foot.

The fine material collected in the bagging bin is suitable for use as a high clarity-low flow rate filter aid. The reflectance of this material was about 84.

It is believed that the lower reflectance of products obtained in Examples X and XI, as compared to product obtained in other examples, was due to the presence of a small amount of rust in the products, which came from the equipment used in these two examples.

Having thus fully described and illustrated the invention, what is desired to be secured by Letters Patent is:

1. In the process of expanding ground perlite at temperatures between about 1500 and 2100° F., the improvement which comprises admixing ground perlite ore, prior to expansion, with an aqueous mineral acid solution to form a slurry, said mineral acid solution having a concentration between about 0.05 and about 0.6 mole of acid in 100 grams of solution, whereby the perlite ore is activated for the expansion step, separating the activated perlite ore from the acid solution, and drying the activated perlite ore.

2. The improved process described in claim 1, where the mineral acid is sulfuric acid.

3. The improved process described in claim 1, where the mineral acid is hydrochloric acid.

4. The improved process described in claim 1, where the mineral acid is nitric acid.

5. The improved process described in claim 1, where the mineral acid is phosphoric acid.

6. The process described in claim 1, where the expanded particles are abraded after expansion.

7. The improved process described in claim 2, where the slurry of perlite ore and sulfuric acid solution is heated at a temperature between about 60° C. and about the boiling temperature for between about 0.25 and about 4 hours.

8. The improved process described in claim 3, where the slurry of perlite ore and hydrochloric acid solution is heated at a temperature between about 60° C. and about the boiling temperature for between about 0.25 and about 4 hours.

9. The improved process described in claim 4, where the slurry of perlite ore and nitric acid solution is heated at a temperature between about 60° C. and about the boiling temperature for between about 0.25 and about 4 hours.

10. The improved process described in claim 5, where the slurry of perlite ore and phosphoric acid solution is heated at a temperature between about 60° C. and about the boiling point for between about 0.25 and about 4 hours.

11. The process described in claim 6, where ground perlite ore having a particle size less than about 30 mesh is added to a boiling solution of sulfuric acid having a concentration between about 0.05 and about 0.6 mols $H_2SO_4$ in 100 grams of solution, to form a slurry having a solids content of between about 50 and 60% solids, maintaining the temperature of the slurry at about the boiling point for between about 1.5 and about 3 hours, separating the acid from the solids, washing the solids until substantially free of acid, drying the solids at a temperature less than about 140° C., expanding the solids in a vertical furnace at a temperature between about 1500° and about 2100° F., impacting the expanded solids against abrading surfaces above the furnace, separating the fine particles having a diameter less than about 50 microns from the coarse particles, recycling the coarse particles to the abrading surfaces, and collecting the fine perlite particles.

12. A novel expanded perlite material having improved filtration characteristics and improved light reflecting properties, prepared by admixing ground perlite ore, prior to expansion, with an aqueous mineral acid solution to form a slurry, said mineral acid solution having a concentration between about 0.05 and about 0.6 mol of acid in 100 grams of solution, whereby the perlite ore is activated for expansion, separating the activated perlite ore from the acid solution, drying the activated perlite ore, and heating the activated perlite ore to a temperature between about 1500 and about 2100° F.

References Cited in the file of this patent

UNITED STATES PATENTS

| | | |
|---|---|---|
| 1,191,383 | Aylsworth | July 18, 1916 |
| 1,571,518 | Foster | Feb. 2, 1926 |
| 1,898,830 | Guthrie et al. | Feb. 21, 1933 |
| 2,492,208 | Barnes | Dec. 27, 1949 |
| 2,651,470 | Dodds et al. | Sept. 8, 1953 |